United States Patent [19]

Leigh-Monstevens

[11] Patent Number: 4,821,627
[45] Date of Patent: Apr. 18, 1989

[54] PISTON AND CYLINDER ASSEMBLY
[76] Inventor: Keith V. Leigh-Monstevens, 5622 Larkins Dr., Troy, Mich. 48098
[21] Appl. No.: 111,924
[22] Filed: Oct. 23, 1987

Related U.S. Application Data

[63] Continuation-in-part of Ser. No. 58,781, Jun. 5, 1987.

[51] Int. Cl.⁴ .............................................. F01B 31/00
[52] U.S. Cl. ................... 92/107; 277/206 A; 277/212 C; 192/91 A; 192/85 CA; 403/265
[58] Field of Search ................ 192/91 A, 85 CA; 277/166, 235 R, 206 A, 208, 209, 210, 212 C, 212 R; 92/107, 108, 109, 165 R; 403/265, 267

[56] References Cited

U.S. PATENT DOCUMENTS

| | | | |
|---|---|---|---|
| 2,895,773 | 7/1959 | McConnaughey | 277/208 |
| 4,585,106 | 4/1986 | Shirley | 192/85 CA |
| 4,585,107 | 4/1986 | Monstevens | 192/85 CA |
| 4,585,108 | 4/1986 | Monstevens | 192/85 CA |
| 4,585,109 | 4/1986 | Shirley et al. | 192/85 CA |
| 4,601,374 | 7/1986 | Ladin | 192/85 CA |
| 4,624,290 | 11/1986 | Compton et al. | 141/1 |
| 4,660,694 | 4/1987 | Nix et al. | 192/85 CA |
| 4,664,393 | 5/1987 | Hazebrook | 277/212 C |
| 4,683,810 | 8/1987 | Afimiwala | 403/267 |
| 4,684,003 | 8/1987 | Monstevens | 192/85 CA |
| 4,687,084 | 8/1987 | Monstevens et al. | 192/85 CA |

Primary Examiner—Robert E. Garrett
Assistant Examiner—Thomas Denion
Attorney, Agent, or Firm—Krass & Young

[57] ABSTRACT

A piston and cylinder assembly for the annular type in which the cylinder defines an annular housing chamber slidably receiving an annular piston. The inboard end of the annular piston is enlarged to define an enlarged annular inboard end edge and an annular seal is positively secured to the enlarged inboard end edge of the piston and sealingly engages the associated cylindrical surfaces of the housing member. The enlarged annular inboards end edge of the piston is convoluted to maximize the area of the bonding interface between the piston and the seal so as to preclude extrusion of the seal and twisting of the seal during operation of the piston and cylinder assembly.

15 Claims, 2 Drawing Sheets

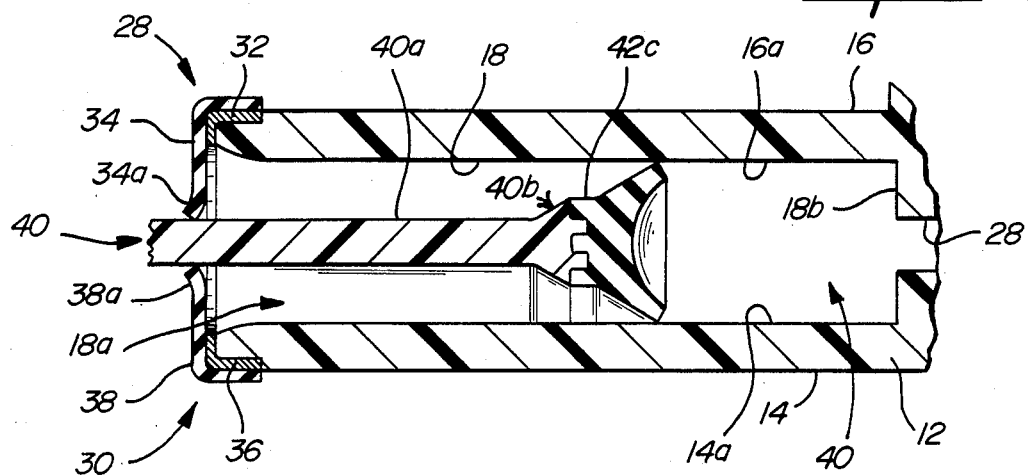
FIG. 4
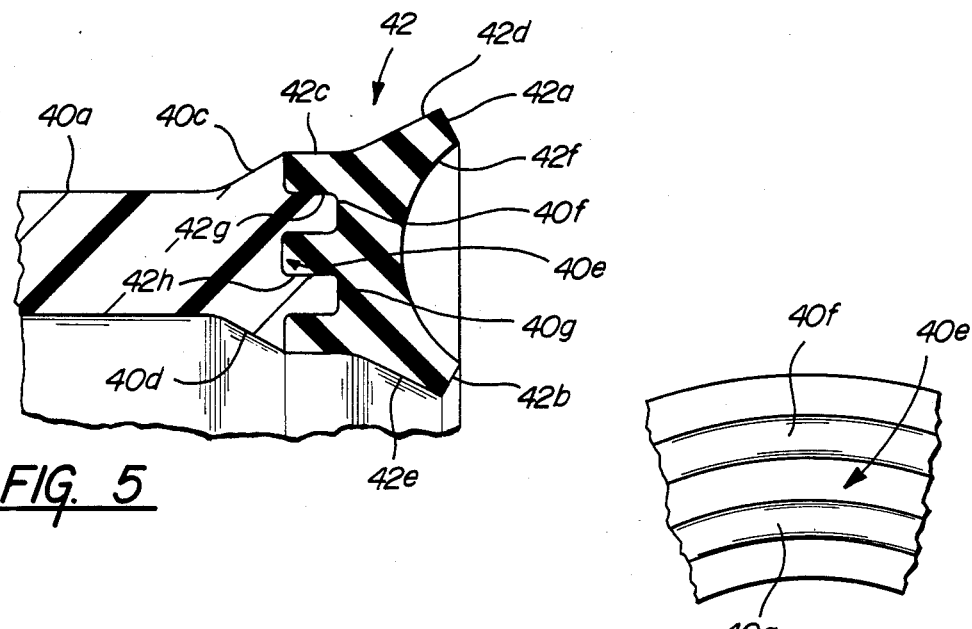
FIG. 5
FIG. 6
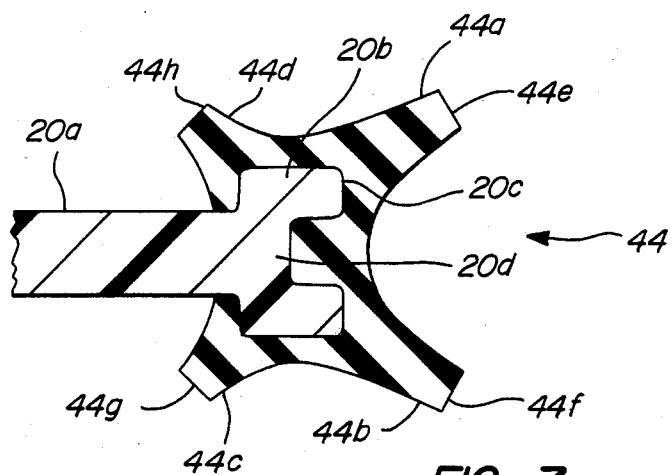
FIG. 7

PISTON AND CYLINDER ASSEMBLY

RELATED APPLICATION

This application is a continuation-in-part of U.S. patent application Ser. No. 058,781 filed June 5, 1987.

BACKGROUND OF THE INVENTION

This invention relates to piston and cylinder assemblies and further to a piston and seal assembly for use with a piston and cylinder assembly. More particularly, this invention relates to a piston and cylinder assembly in which the cylinder defines an annular pressure chamber and in which the piston is annular and is slidably received in the annular pressure chamber.

Annular piston and cylinder assemblies are in wide use in industry. For example, such assemblies are utilized in vehicular clutch assemblies wherein the assembly is positioned concentrically around the main drive shaft of the vehicle and the annular piston is connected to the release bearing of the clutch assembly so that sliding movement of the annular piston in the annular pressure chamber of the cylinder operates in known manner to engage and disengage the clutch of the vehicle. It is important in assemblies of this type that the pressure chamber defined within the cylinder be effectively and adequately sealed. In one prior art sealing arrangement, a separate annular elastomeric seal is positioned in the pressure chamber for axial movement with the piston. Whereas this arrangement has been generally satisfactory, there are operating environments in which the separate seal becomes twisted in the pressure chamber and fails to provide an effective sealing action. In another prior art sealing arrangement, the annular seal is secured to the inboard annular edge of the piston. In this prior art arrangement, whereas the seal is essentially precluded from twisting in the pressure chamber, the seal has a tendency to extrude itself relative to the associated piston and thereby derogate the sealing action and/or derogate the travel efficiency of the assembly. The attached seal also can become detached from the associated piston with consequent loss of an effective sealing operation.

SUMMARY OF THE INVENTION

This invention is directed to the provision of an improved piston and cylinder assembly of the type including an annular cylinder housing receiving an annular piston.

The piston and cylinder assembly of the invention is of the type including a housing defining spaced inner and outer cylindrical surfaces concentric to the central axis of the assembly and defining an annular housing chamber therebetween closed at the inboard end thereof and open at the outboard end thereof and an annular piston having an annular main body portion extending into the open outboard end of the housing chamber to dispose the inboard end portion of the piston within the chamber. According to the invention, the main body portion of the piston has a wall thickness less than the radial distance between the housing surfaces and is positioned centrally in the housing chamber in concentric relation to the assembly axis to define spaced concentric annular spaces on either radial side of the main body portion; the inboard end portion of the piston is radially enlarged relative to the main body portion to define an enlarged annular end edge within the housing chamber facing the closed end of the chamber; and an annular elastomeric member is secured to the enlarged annular end edge of the inboard piston end Portion and defines annular sealing surfaces respectively sealingly engaging the inner and outer cylindrical housing surfaces to define an expansible pressure chamber between the seal and the closed end of the housing chamber. This arrangement provides firm wide area backing for the seal so as to minimize seal twisting and seal extrusion with a resultant improvement in the sealing action and the travel efficiency of the assembly.

According to a further feature of the invention, the seal includes a main body annular portion secured to the enlarged annular end edge of the radially enlarged inboard end of the end portion of the piston and a pair of annular lip portions extending radially outwardly and axially inboard from the main body portion to respectively define the annular sealing surfaces. This arrangement provides a compact seal having a minimum of elastomeric volume and yet providing effective sealing while maximizing travel efficiency of the piston within the cylinder.

According to a further feature of the invention, the inboard end portion of the piston flares radially outwardly from the main body portion to define the enlarged annular end edge of the piston. This specific geometry allows the piston to be readily formed and provides a convenient and efficient means of defining the enlarged annular end edge of the piston for firm, backing receipt of the seal.

According to a further feature of the invention, at least one annular rib projects axially inboard from the enlarged annular end edge of the piston end portion and the outboard annular edge of the main body portion of the seal includes an annular groove receiving the annular rib. This arrangement provides a convenient and inexpensive means of firmly anchoring the seal to the enlarged annular end edge of the piston.

According to a further feature of the invention, a second annular rib projects axially inboard from the enlarged annular end edge of the piston and the outboard annular edge of the main body portion of the seal includes a second annular groove receiving the second annular rib. This arrangement provides firm seating of the seal on the piston and maximizes the interface area between the seal and the piston so as to allow a firm, wide area bond to be achieved between the two members.

According to a further feature of the invention, the ribs are concentric to the central axis of the assembly and respectively spaced radially inwardly from the radially outer circumferential edge of the enlarged annular end edge and radially outwardly from the radially inner circumferential edge of the enlarged annular end edge, and the grooves are concentric to the central axis of the assembly and respectively spaced radially inwardly from the radially outer circumferential edge of the main body portion of the seal and radially outwardly from the radially inner circumferential edge of the main body portion of the seal. This specific concentric rib and groove arrangement further maximizes the area of the sealing interface between the piston and the seal and further augments the stability of the seal with respect to the piston.

According to a further feature of the invention, the outer circumferential surface of the seal main body portion is flush with the circumferential outer edge of the enlarged annular end edge of the piston end portion.

This arrangement provides a smooth, flowing outer circumferential profile for the piston and seal assembly to further augment the travel efficiency of the assembly.

BRIEF DESCRIPTION OF THE DRAWING

FIG. 4 is a fragmentary view of a modified piston and cylinder assembly according to the invention;

FIG. 5 is a fragmentary view on an enlarged scale of a portion of the piston and cylinder assembly of FIG. 4;

FIG. 6 is a fragmentary end edge view of the piston seen in FIG. 5; and

FIG. 7 is a fragmentary view of a further modified form of the invention piston and cylinder assembly.

DETAILED DESCRIPTION OF THE PREFERRED EMBODIMENTS

Figure 1:
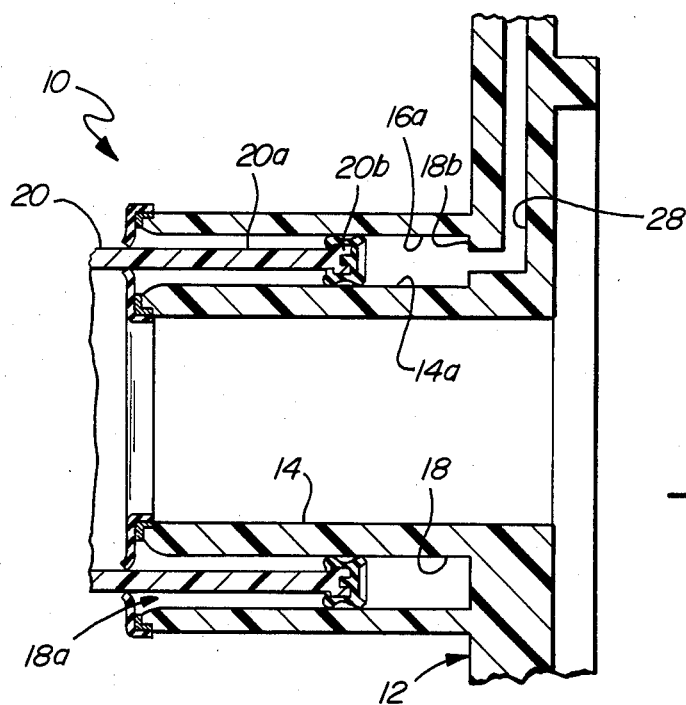
FIG. 1 is a fragmentary view of a piston and cylinder assembly according to the invention.

The invention piston cylinder assembly 10 is seen in FIG. 1 in the form of an annular hydraulic cylinder and piston assembly such for example as a slave cylinder assembly for operating the throw out bearing of a mechanical clutch wherein the assembly is disposed concentrically around the drive shaft coupling a clutch disk to the drive shaft of a gearbox of a motor vehicle. Such a slave cylinder arrangement is shown for example in U.S. Pat. Nos. 4,585,106; 4,585,107; 4,585,108; 4,585,109; 4,624,290; 4,660,694; 4,684,003 and 4,687,084, all assigned to the assignee of the present invention.

The cylinder assembly 10 includes a housing 12 provided with concentric tubular members 14 and 16 preferably cast integrally with housing 12. Members 14 and 16 coact to define an annular cylindrical housing chamber 18 and an annular piston 20 is slidably positioned in chamber 18.

Annular piston 20 includes an annular main body portion 20a extending into the open outboard end 18a of chamber 18 to dispose the inboard end portion 20b of the piston within chamber 18. The main body portion 20a of the piston has a wall thickness substantially less than the radial distance between the inner cylindrical surface 16a of tubular member 16 and the outer cylindrical surface 14a of tubular member 14 and the piston is positioned centrally within housing chamber 18 in concentric relation to the central axis of the piston and cylinder assembly to define spaced concentric annular spaces 22 and 24 on either radial side of the main body portion 20a of the piston.

An annular elastomeric seal 26 is secured to the inboard end 20b of the piston so that hydraulic fluid introduced into the annular chamber 18 through a passageway 28 in housing 12 displaces the piston and seal assembly to the left, as seen in FIG. 1 thereby displacing to the left a throw out bearing (not shown) mounted on the outboard end of the annular piston. The throw out bearing engages the release fingers of the clutch of the vehicle in known manner to disengage the clutch. When hydraulic fluid is withdrawn from chamber 18 through passageway 28, piston 20 is allowed to be displaced to the right under the action of the clutch spring fingers and the clutch is reengaged in known manner.

Inboard end portion 20b of piston 20 is radially enlarged relative to main body portion 20a to define an enlarged annular end edge 20c within the chamber 18 facing the closed end 18b of the chamber.

Elastomeric seal 26 is positioned in encapsulating relation around enlarged piston end portion 20b. End portion 20b has a generally U configuration and extends both radially outwardly and radially inwardly from piston main body portion 20a. Elastomeric seal 26 defines annular sealing surfaces 26a, 26b, 26c and 26d at the four corners of the generally rectangular cross sectional configuration of the elastomeric seal.

Seal 26 may be secured to piston 20 for example by dipping the end portion 20b of the piston in adhesive, placing the piston end portion 20b in a molding tool, closing the tool, and shooting rubber into the tool and into surrounding relation with respect to end portion 20b, whereby to allow the elastomeric material to surround the end portion 20b in bonding relation thereto.

Figure 2:
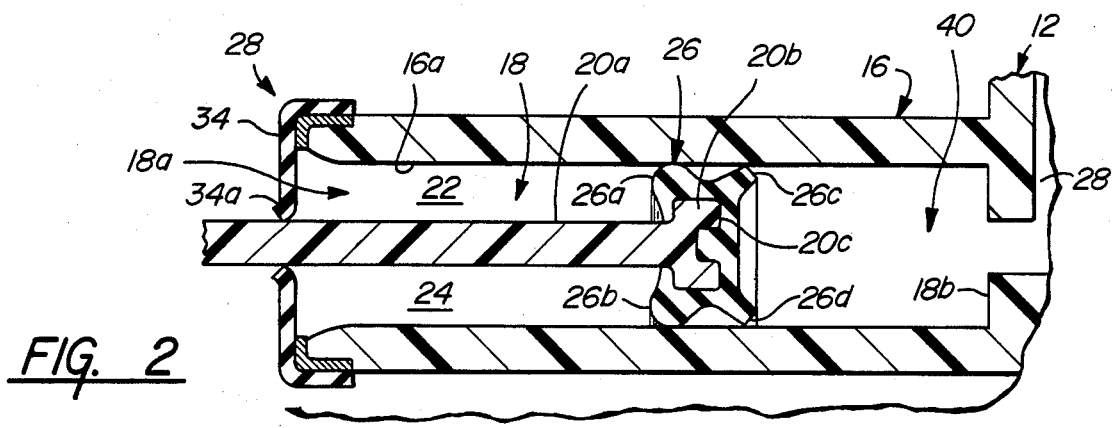
FIG. 2 is a fragmentary view on an enlarged scale showing a portion of the piston and cylinder assembly of FIG. 1.
Figure 3:
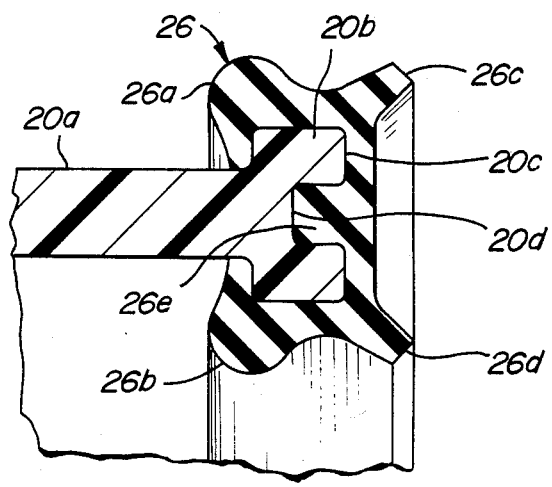
FIG. 3 is a fragmentary view on a still further enlarged scale showing a portion of the piston and cylinder assembly of FIG. 2.

The concentric slave cylinder assembly of FIGS. 1-3 further includes an outer wiper seal assembly 28 and an inner wiper seal assembly 30. Outer wiper seal assembly 28 includes an annular steel stamping 32 press fit on the free annular end of outer annular housing member 16 and an elastomeric wiper seal 34 bonded to stamping 32 and including an inner annular lip portion 34a wipingly engaging the outer periphery of annular piston 20. Inner wiper seal assembly 30 includes an annular steel stamping 36 press fit on the free annular end of inner annular housing member 14 and an elastomeric wiper seal 38 bonded to stamping 36 and including an annular lip portion 38a wipingly engaging the inner periphery of annular piston 20.

When the piston and cylinder assembly of FIGS. 1-3 is utilized in a typical piston and cylinder assembly, such as a concentric slave cylinder for operating the clutch of a motor vehicle, annular sealing surfaces 26c and 26d function to maintain pressure in the expansible pressure chamber 40 defined between the inboard end of seal 26 and the closed end 18b of housing chamber 18, and annular sealing surfaces 26a and 26b function to preclude the entry of contaminants into the sealing interface. Wiper seal assemblies 28 and 30 function to further preclude the entry of contaminants into the sealing interface. Elastomeric seal 26 also functions to maintain annular piston 20 in concentric, spaced relation to cylindrical housing surfaces 14a and 16a with a consequent reduction in sliding friction as between the several annular reciprocating members 14, 16 and 20. The enlarged end portion 20b of the annular piston serves to substantially reduce the total volume of rubber in the seal assembly, thereby reducing seal squish and increasing travel efficiency and load efficiency of the piston and cylinder assembly. Enlarged end portion 20b further serves to define the enlarged annular end edge 20c of the piston to maximize the bonding interface area between the seal and the piston and thereby provide a secure bonding as between the seal and the piston. Specifically, the enlarged end portion 20b of the piston and the enlarged annular end edge 20c coact to provide a firm backing for the seal, to minimize extrusion of the elastomeric material of the seal, and to preclude twisting of the seal relative to the piston. The positive bonding of the seal to the piston is further augmented by the provision of a concentric annular groove 20d in the inboard edge 20c of the piston receiving a concentric annular rib portion 26d on the seal 26.

In the piston and cylinder assembly seen in FIGS. 4 and 5, like reference numerals have been employed for those parts which correspond to the parts of the assembly of FIGS. 1 through 3. Thus the assembly of FIGS. 4 and 5 includes a housing 12 provided with concentric tubular members 14 and 16 cast integrally with housing 12; members 14 and 16 coact to define an annular cylindrical housing chamber 18; the pressure fluid is introduced into chamber 18 through a passageway 28 in the housing; and inner and outer wiper seal assemblies 28 and 30 are provided at the open outboard end 18a of the chamber 18 for wiping engagement with the inner and outer cylindrical surfaces of the piston.

The piston 40 and the annular elastomeric seal 42 attached thereto differ from the piston and seal of the FIGS. 1–3 embodiment.

Specifically, piston 40 includes an annular main body portion 40a extending into the open outboard end 18a of the housing chamber 18 and an inboard end portion 40b disposed within the chamber 18.

Inboard end portion 40b is radially enlarged with respect to main body portion 40a and, specifically, flares radially outwardly at 40c and 40d to form an enlarged annular end edge 40e within chamber 18. A pair of concentric annular ribs 40f and 40g project axially inboard from enlarged annular end edge 40e with outer rib 40f spaced radially inwardly from the radially outer circumferential edge of enlarged annular end edge 40e and inner rib 40g spaced outwardly from the radially inner circumferential edge of enlarged annular end edge 40e.

Seal 42 is secured to the enlarged annular end edge 40e of the piston and defines annular sealing surfaces 42a and 42b respectively sealingly engaging the inner cylindrical surface 16a of outer tubular member 16 and the outer cylindrical surface 14a of inner tubular member 14 to define an expansible pressure chamber 40 between the seal and closed end 18b of housing chamber 18. Seal 42 includes a main body annular portion 42c secured to the enlarged annular end edge 40e of the piston, and a pair of annular lip portions 42d and 42e extending radially outwardly and axially inboard from the main body portion 42c to respectively define annular sealing surfaces 42a and 42b. An annular groove 42f in the inboard face of the seal serves to define the radially inner surfaces of the lip portions so as to provide flexibility for the lip portions and so as to minimize the elastomeric volume of the seal. The outboard annular face of main body portion 42c includes a pair of concentric annular grooves 42g and 42h respectively receiving concentric ribs 40f and 40g of the piston.

In the assembled relation of the seal on the piston, the outer circumferential surface of the seal main body portion 42c is flush with the circumferential outer edge of the enlarged annular end edge 40e of the piston so as to provide a smooth, continuous profile for the piston and cylinder assembly.

As with the piston and cylinder assembly of FIGS. 1–3, seal 42 may be secured to piston 40 by dipping the enlarged end portion 40b of the piston in adhesive, placing the piston end portion 40b in a molding tool, closing the tool, and shooting rubber into the tool and into surrounding relation with respect to end portion 20b, whereby to allow the elastomeric material to bond to the piston with the enlarged and convoluted annular end edge 40e maximizing the area of the bonding interface between the seal and the piston.

When the piston and cylinder assembly of FIGS. 4 and 5 is utilized in a typical piston and cylinder assembly, such as a concentric slave cylinder for operating the clutch of a motor vehicle, annular sealing surfaces 42a and 42b function to maintain pressure in the expansible pressure chamber 40 defined between the inboard end Of the seal and the closed end 18b of the housing chamber 18, and wiper seal assemblies 28 and 30 function to preclude the entry of contaminate into the sealing interface. Elastomeric seal 42 also functions to maintain annular piston 40 in concentric, spaced relation to cylindrical housing surfaces 14a and 16a with a consequent reduction in sliding friction as between the several annular reciprocating members 14, 16 and 40. The enlarged end portion 40b of the annular piston serves to substantially reduce the total volume of rubber in the seal assembly, thereby reducing seal squish and increasing travel efficiency and load efficiency of the piston and cylinder assembly. Enlarged end portion 40b further serves to define the enlarged annular end edge 40e of the piston to maximize the bonding interface area between the seal and the piston and thereby provide a secure bonding s between the seal and the piston. Specifically, the large area convoluted annular end edge 40e provides a firm backing for the seal, minimizes extrusion of the elastomeric material of the seal, and precludes twisting of the seal relative to the piston.

The piston and seal assembly of FIG. 7 is generally similar to the piston and seal assembly of the FIGS. 1–3 embodiment with the exception that the annular seal 44 includes four lip portions 44a, 44b, 44c and 44d respectively defining four annular sealing surfaces 44e, 44f, 44g and 44n.

When the piston and seal assembly seen in FIG. 7 is utilized in a typical piston and cylinder assembly, such as a concentric slave cylinder for operating the clutch or a motor vehicle, annular sealing surfaces 44e and 44f function to maintain pressure in the pressure chamber of the piston and cylinder assembly and annular sealing surfaces 44g and 44h function to preclude the entry of contaminants into the sealing interface.

In each of the various disclosed embodiments of the invention piston and cylinder assembly, it will be seen that the enlarged inboard end portion of the piston defines a convoluted enlarged inboard annular end edge which bonds with the annular seal to provide a firm backing and a firm attachment for the seal to minimize extrusion of the seal during operation of the piston and cylinder assembly and to preclude twisting of the seal relative to the piston during operation of the piston and cylinder assembly. The described piston and seal constructions also serve to ensure that the main body of the piston is positively spaced from the confronting inner and outer cylindrical surfaces of the housing so as to maximize the travel efficiency of the piston and cylinder assembly.

Whereas preferred embodiments of the invention have been illustrated and described in detail, it will be apparent that various changes may be made in the disclosed embodiments without departing from the scope or spirit of the invention.

I claim:
1. A piston and cylinder assembly comprising:
(A) a housing defining spaced inner and outer cylindrical surfaces concentric to the central axis of the assembly and defining an annular housing chamber therebetween closed at the inboard end thereof and open at the outboard end thereof.

(B) an annular piston having an annular main body portion extending into the open outboard end of said housing chamber to dispose the inboard end portion of said piston within said chamber,
  (1) said main body portion of said piston having a wall thickness less than the radial distance between said housing surfaces and positioned centrally in said housing chamber in concentric relation to said axis to define spaced concentric annular spaces on either radial side of said main body portion,
  (2) said inboard end portion of said piston being radially enlarged relative to said main body portion to define an enlarged annular end edge within said chamber facing the closed end of said chamber and having a convoluted cross-sectional configuration; and
(C) an annular elastomeric seal moldingly bonded to said enlarged annular end edge of said inboard piston end portion with the elastomeric material of the seal conforming to and moldingly bonded to said convoluted end edge, the elastomeric material of the seal intimately conforming to and intimately moldingly bonded to said enlarged annular end portion over the entire interface between said seal and said piston, and with said seal defining annular sealing surfaces respectively sealingly engaging said inner and outer cylindrical housing surfaces to define an expansible pressure chamber between said seal and said closed end of said housing chamber.

2. An assembly according to claim 1 wherein:
(D) said seal includes a main body annular portion secured to said enlarged annular end edge of said radially enlarged inboard end portion of said piston and a pair of annular lip portions extending radially outwardly and axially inboard from said main body portion to respectively define said annular sealing surfaces.

3. An assembly according to claim 2 wherein:
(E) said inboard end portion of said piston flares radially outwardly from said main body portion to define said enlarged annular end edge.

4. An assembly according to claim 3 wherein:
(F) at least one annular rib projects axially inboard from said enlarged annular end edge to define said convoluted cross-section configuration; and
(G) the outboard annular edge of said main body portion of said seal includes an annular groove receiving said annular rib.

5. An assembly according to claim 4 wherein:
(H) a second number rib projects axially inboard from said enlarged annular end edge to further define said convoluted cross-sectional configuration; and
(I) the outboard annular edge of said main body portion of said seal includes a second annular groove receiving said second annular rib.

6. An assembly according to claim 5 wherein:
(J) said ribs are concentric to said axis and respectively spaced radially inwardly from the radially outer circumferential edge of said enlarged annular end edge and radially outwardly from the radially inner circumferential edge of said enlarged annular end edge; and
(K) said grooves are concentric to said axis and respectively spaced inwardly from the radially outer circumferential edge of said main body portion of said seal and radially outwardly from the radial inner circumferential edge of said main body portion of said seal.

7. An assembly according to claim 6 wherein:
(L) the outer circumferential surface of said seal main body portion is flush with the circumferential outer edge of said enlarged annular end edge of said piston end portion.

8. A piston and seal assembly comprising:
(A) an annular piston having an annular main body portion and a radially enlarged end portion presenting an enlarged annular end edge; and
(B) an annular elastomeric seal moldingly bonded to and moldingly encapsulating said enlarged annular end portion with the elastomeric material of the seal intimately conforming to and intimately moldingly bonded to said enlarged annular end portion over the entire interface between said seal and said piston.

9. An assembly according to claim 8 wherein:
(C) said seal in cross section defines four corners and a separate annular sealing surface is defined at each of its four corners.

10. A piston and seal assembly comprising:
(A) an annular piston having an annular main body portion and a radially enlarged end portion presenting an enlarged annular end edge having a convoluted cross-sectional configuration; and
an anunular elastomeric seal moldingly bonded to said enlarged annular end edge of said end portion with the elastomeric material of the seal conforming to and moldingly bonded to said convoluted end edge, the elastomeric material of the seal intimately conforming to and intimately moldingly bonded to said enlarged annular end portion over the entire interface between said seal and said piston, and with said seal defining annular sealing surfaces for respectively sealing coaction with inner and outer cylindrical surfaces on an associated housing.

11. An assembly according to claim 10 wherein:
(D) said end portion of said piston flares radially outwardly from said main body portion to define said enlarged annular end edge.

12. An assembly according to claim 11 wherein:
(E) at least one annular rib projects axially inboard from said enlarged annular end edge; and
(F) the confronting annular edge of said main body portion of said seal includes an annular groove receiving said annular rib.

13. An assembly according to claim 12 wherein:
(G) a second annular rib projects axially from said enlarged annular end edge; and
(H) the confronting annular edge of said main body portion of said seal includes a second annular groove receiving said second annular rib.

14. An assembly according to claim 13 wherein:
(I) said ribs are concentric to the central axis of said assembly and respectively spaced radially inwardly from the radially outer circumferential edge of said enlarged annular end edge and radially outwardly from the radially inner circumferential edge of said enlarged annular end edge; and
(J) said grooves are concentric to said axis and respectively spaced inwardly from the radially outer circumferential edge of said main body portion of said seal and radially outwardly from the radially inner circumferential edge of said main body portion of said seal.

15. An assembly according to claim 14 wherein:
(K) the outer circumferential surface of said seal main body portion is flush with the circumferential outer edge of said enlarged annular end edge of said piston end portion.

* * * * *

UNITED STATES PATENT AND TRADEMARK OFFICE
CERTIFICATE OF CORRECTION

PATENT NO. : 4,821,627

DATED : April 18, 1989

INVENTOR(S) : Leigh-Monstevens et al

It is certified that error appears in the above-identified patent and that said Letters Patent is hereby corrected as shown below:

On the face of the patent the Assignee of record is Automotive Products, plc, Warwickshire, England.

On the face of the patent in the Abstract, line 9, "inboards" should be --inboard--.

Column 2, line 3, "Portion" should be --portion--.

Column 4, line 68, "26d" should be --26e--.

Column 6, line 7, "Of" should be --of--.

Column 6, line 23, "s" should be --as--.

Column 7, line 50, "number" should be --annular--.

Signed and Sealed this

Thirty-first Day of July, 1990

Attest:

HARRY F. MANBECK, JR.

Attesting Officer

Commissioner of Patents and Trademarks